UNITED STATES PATENT OFFICE.

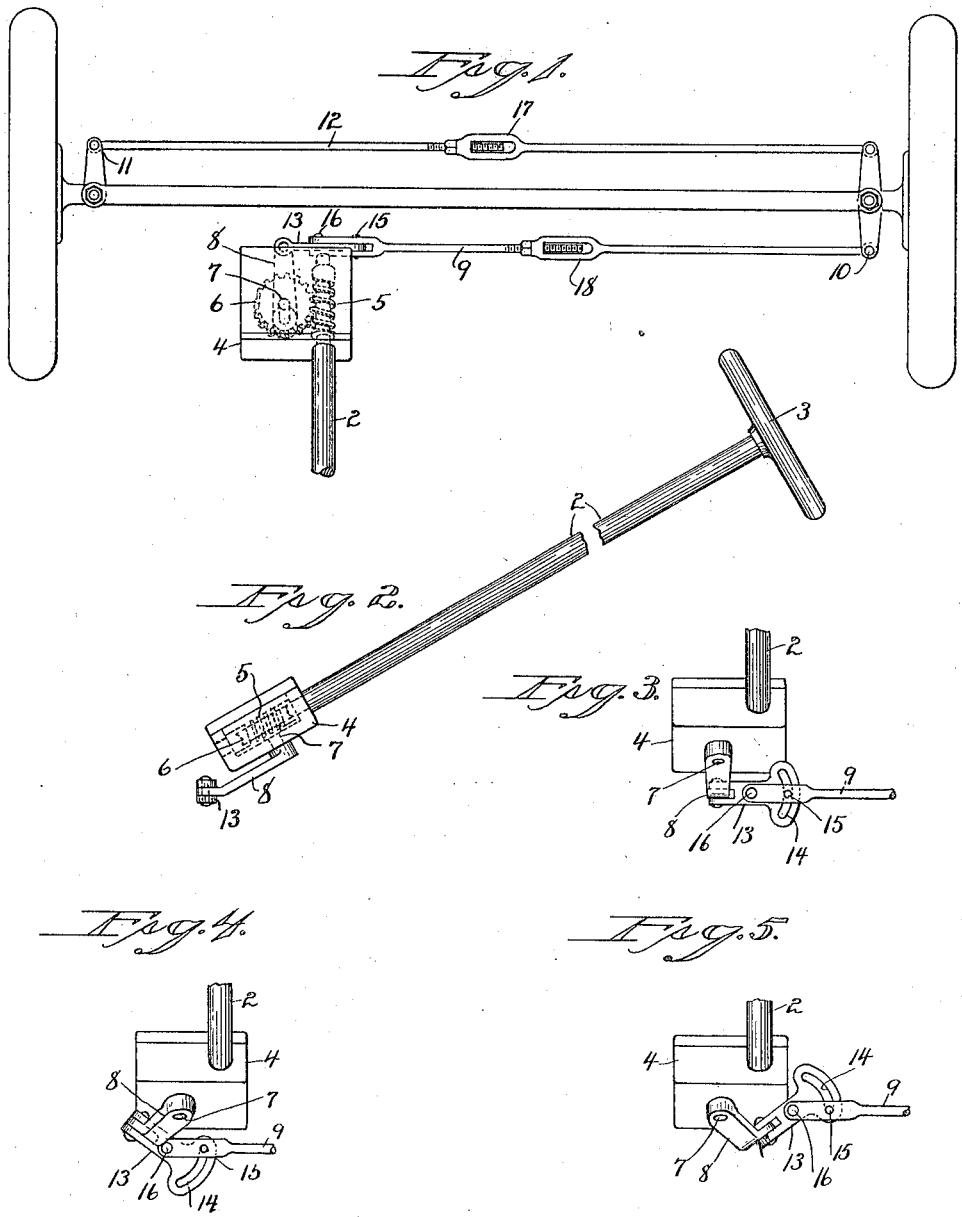

GIROLAMO COMI, OF COBALT, CONNECTICUT.

STEERING MECHANISM FOR AUTOMOBILES.

1,180,761. Specification of Letters Patent. Patented Apr. 25, 1916.

Application filed December 1, 1915. Serial No. 64,425.

*To all whom it may concern:*

Be it known that I, GIROLAMO COMI, a citizen of the United States, residing at Cobalt, in the county of Middlesex and State of Connecticut, have invented a new and useful Improvement in Steering Mechanism for Automobiles; and I do hereby declare the following, when taken in connection with the accompanying drawings and the characters of reference marked thereon, to be a full, clear, and exact description of the same, and which said drawings constitute part of this application, and represent, in—

Figure 1 a broken plan view of a steering mechanism for automobiles constructed in accordance with my invention. Fig. 2 a side view of the same. Fig. 3 a rear view showing the steering mechanism in the straight-away steering position. Fig. 4 a similar view showing the movement turned to the right. Fig. 5 a similar view showing the movement turned to the left.

This invention relates to an improvement in steering mechanism for automobiles, the object being to compensate for motion between the steering post and the coupling rods which extend to the knuckles, and the invention consists in the construction hereinafter described and particularly recited in the claims.

In carrying out my invention I have illustrated it as applied to a type of steering mechanism in which the steering mechanism is operated through means of a worm on the steering post coöperating with a worm-gear connected with the coupling rods, but it will be apparent that it is applicable to other types of steering mechanism.

As herein shown, the usual steering post 2 which has a steering wheel 3 extends at its lower end into a gear box 4 and is provided at the lower end within the box with a worm 5 meshing with a worm gear 6 mounted within the gear box 4 upon a pin 7 which projects below the gear box and is mounted in a steering arm 8. This steering arm is usually connected by a ball and socket joint with the coupling rod 9 which extends to one knuckle 10 that knuckle being connected with the other knuckle 11 by a coupling rod 12. Owing to the inclination of the steering arm its outer end does not swing in a true horizontal plane and to provide for movement in a horizontal plane in line with the coupling rod 9, I pivotally connect the steering arm 8 with a yoke 13, this yoke being formed with a segmental limiting slot 14 through which a limiting pin 15 in the end of the coupling rod extends, the coupling rod 9 being pivoted to the yoke as at 16. As the steering arm is moved in one direction or the other, it will correspondingly move the coupling rod 9, and hence move the knuckles, and owing to the point of pivoting the rod to the yoke necessary movement is permitted to compensate for the inclination of the steering arm and so move the coupling rod 9 in a straight line. By this construction I avoid all use of ball-and-socket joints and make a positive pin connection, and this feature is carried out in connecting the coupling rods with the knuckles. These coupling rods are provided with the usual take-ups 17 and 18.

I claim:—

1. A steering mechanism for automobiles comprising a steering post provided at its lower end with a worm, a steering arm having a pin, a worm gear mounted on said pin and meshed with said worm, a yoke pivotally connected with said steering arm, and a coupling rod connected with said yoke.

2. A steering mechanism for automobiles including a coupling rod and a steering arm, a steering post provided at its lower end with a worm, a worm gear mounted on the steering arm, said steering arm pivotally connected with a yoke, said yoke pivotally connected with the said coupling rod, said yoke formed with a segmental slot, and a pin mounted in the coupling rod and passing through said slot.

3. In a steering mechanism for automobiles, the combination with a coupling rod, of a steering post, a steering arm adapted to be moved by the movement of said steering post and inclined at its outer end, and a yoke interposed and pivotally connected with the steering arm and coupling rod.

GIROLAMO COMI.

Copies of this patent may be obtained for five cents each, by addressing the "Commissioner of Patents, Washington, D. C."